(12) United States Patent
Urbach

(10) Patent No.: US 10,114,660 B2
(45) Date of Patent: Oct. 30, 2018

(54) SOFTWARE APPLICATION DELIVERY AND LAUNCHING SYSTEM

(76) Inventor: Julian Michael Urbach, Sherman Oaks, CA (US)

( * ) Notice: Subject to any disclaimer, the term of this patent is extended or adjusted under 35 U.S.C. 154(b) by 471 days.

(21) Appl. No.: 13/031,747

(22) Filed: Feb. 22, 2011

(65) Prior Publication Data

US 2012/0215831 A1 Aug. 23, 2012

(51) Int. Cl.
*G06F 15/16* (2006.01)
*G06F 9/445* (2018.01)
*G06F 9/448* (2018.01)

(52) U.S. Cl.
CPC ........ *G06F 9/44573* (2013.01); *G06F 9/4484* (2018.02); *G06F 9/44526* (2013.01); *G06F 9/44584* (2013.01); *G06F 9/44594* (2013.01)

(58) Field of Classification Search
CPC . H04L 67/2842; H04L 67/2852; H04L 67/34; H04L 29/06027
USPC .................................. 709/223, 203; 719/321
See application file for complete search history.

(56) References Cited

U.S. PATENT DOCUMENTS

| | | | |
|---|---|---|---|
| 5,740,248 A * | 4/1998 | Fieres et al. ................... | 713/156 |
| 5,870,609 A | 2/1999 | Thornton et al. | |
| 6,052,780 A | 4/2000 | Glover | |
| 6,125,409 A | 9/2000 | Le Roux | |
| 6,226,665 B1 | 5/2001 | Deo et al. | |
| 6,243,789 B1 | 6/2001 | Hasbun et al. | |
| 6,493,871 B1 | 12/2002 | McGuire et al. | |
| 6,570,926 B1 | 5/2003 | Agrawal et al. | |
| 6,598,130 B2 * | 7/2003 | Harris et al. ................... | 711/147 |
| 6,637,023 B1 | 10/2003 | Ginsberg | |
| 6,976,062 B1 * | 12/2005 | Denby ....................... | G06F 8/65 |
| | | | 709/203 |
| 6,986,133 B2 | 1/2006 | O'Brien | |
| 7,039,116 B1 | 5/2006 | Zhang et al. | |
| 7,051,315 B2 * | 5/2006 | Artzi et al. ................... | 717/103 |
| 7,188,186 B1 | 3/2007 | Meyer et al. | |
| 7,203,940 B2 | 4/2007 | Barmettler et al. | |
| 7,606,924 B2 | 10/2009 | Raz | |
| 7,673,297 B1 | 3/2010 | Arsenault et al. | |
| 7,827,611 B2 | 11/2010 | Kouznetsov et al. | |
| 7,886,287 B1 | 2/2011 | Davda | |
| 8,055,910 B2 | 11/2011 | Kocher et al. | |

(Continued)

FOREIGN PATENT DOCUMENTS

CN 101689173 A 3/2010
WO WO 2009/078610 6/2009

OTHER PUBLICATIONS

International Search Report (PCT/US2012/026125) dated Sep. 12, 2012; 3 pages.

(Continued)

*Primary Examiner* — Sm Rahman
(74) *Attorney, Agent, or Firm* — James J. DeCarlo; Greenberg Traurig, LLP

(57) ABSTRACT

One embodiment allocates a first virtual memory; receives executable code of a first piece of software; writes the executable code of the first piece of software directly into the first virtual memory; marks the first virtual memory as executable; executes the executable code of the first piece of software directly from the first virtual memory; and downloads and executes executable code of a second piece of software as facilitated by the executable code of the first piece of software.

25 Claims, 4 Drawing Sheets

(56) References Cited

U.S. PATENT DOCUMENTS

| | | | |
|---|---|---|---|
| 8,621,077 B2* | 12/2013 | Hinchliffe et al. | 709/225 |
| 8,745,601 B1* | 6/2014 | Carlson | G06F 9/445 |
| | | | 717/134 |
| 9,354,853 B2* | 5/2016 | McJilton | G06F 8/61 |
| 2002/0129107 A1* | 9/2002 | Loughran | G06F 8/65 |
| | | | 709/206 |
| 2004/0010587 A1 | 1/2004 | Altamirano et al. | |
| 2004/0230971 A1 | 11/2004 | Rachman | |
| 2005/0005270 A1 | 1/2005 | Bucher et al. | |
| 2005/0216757 A1* | 9/2005 | Gardner | G06F 21/50 |
| | | | 713/194 |
| 2006/0158354 A1 | 7/2006 | Aberg et al. | |
| 2006/0282620 A1* | 12/2006 | Kashyap et al. | 711/128 |
| 2006/0288420 A1 | 12/2006 | Mantripragada et al. | |
| 2007/0033419 A1 | 2/2007 | Kocher et al. | |
| 2007/0180061 A1* | 8/2007 | Bantz | G06Q 10/00 |
| | | | 709/219 |
| 2008/0056671 A1 | 3/2008 | Kamijo et al. | |
| 2008/0147682 A1* | 6/2008 | O'Kelley | G06Q 10/10 |
| 2008/0201705 A1* | 8/2008 | Wookey | G06F 8/68 |
| | | | 717/175 |
| 2009/0007089 A1 | 1/2009 | Rothman et al. | |
| 2009/0064286 A1 | 3/2009 | Murphy | |
| 2009/0083474 A1 | 3/2009 | Cooke | |
| 2009/0113402 A1* | 4/2009 | Chen | G06F 8/41 |
| | | | 717/140 |
| 2009/0172637 A1 | 7/2009 | Parikh | |
| 2009/0183182 A1* | 7/2009 | Parthasarathy et al. | 719/321 |
| 2009/0217163 A1 | 8/2009 | Jaroker | |
| 2009/0222810 A1 | 9/2009 | Walston | |
| 2009/0248524 A1* | 10/2009 | Defoy | G06F 17/30893 |
| | | | 705/14.1 |
| 2009/0271787 A1 | 10/2009 | Clark | |
| 2009/0282474 A1 | 11/2009 | Chen et al. | |
| 2010/0037206 A1 | 2/2010 | Larimore et al. | |
| 2010/0259559 A1 | 10/2010 | Schneider | |
| 2011/0047540 A1 | 2/2011 | Williams et al. | |
| 2012/0131564 A1* | 5/2012 | Das | G06F 8/71 |
| | | | 717/168 |

OTHER PUBLICATIONS

International Search Report (WO 2011/063396) dated Aug. 29, 2011; 2 pages.
Supplementary European Search Report (EP 12 75 0056) dated Mar. 6, 2015; 8 pages.

* cited by examiner

SOFTWARE APPLICATION DELIVERY AND LAUNCHING SYSTEM

TECHNICAL FIELD

The present disclosure generally relates to the distribution of computer software over a computer network and more specifically relates to deploying computer software over a computer network from a server to a client for execution on the client without installing any portion of the software on the client.

BACKGROUND

Computer software may be distributed to individual computer systems in various ways. For example, a piece of software may be stored on a Compact Disc (CD) or a Digital Versatile Disc (DVD). A person may put such a disc in a disc drive of a computer system to install the piece of software stored on the disc onto the computer system. More recently, computer networks provide another channel for software distribution. A person may download a piece of software from a remote computer system (e.g., a server) over a computer network (e.g., the Internet) onto his own computer system (e.g., a client). Often, the file downloaded over the network may be an installation suite, script, or executable in which the piece of software is embedded. The person may save the downloaded file on the hard drive of his computer system, either at a permanent location or in a temporary directory, and run the saved file to install the piece of software on his computer system.

SUMMARY

The present disclosure generally relates to the distribution of computer software over a computer network and more specifically relates to deploying computer software over a computer network from a server to a client for execution on the client without installing any portion of the software on the client.

Particular embodiments allocate a first virtual memory; receive executable code of a first piece of software; write the executable code of the first piece of software directly into the first virtual memory; mark the first virtual memory as executable; execute the executable code of the first piece of software directly from the first virtual memory; and download and execute executable code of a second piece of software as facilitated by the executable code of the first piece of software.

These and other features, aspects, and advantages of the disclosure are described in more detail below in the detailed description and in conjunction with the following figures.

DETAILED DESCRIPTION OF EXAMPLE EMBODIMENTS

Figure 1:
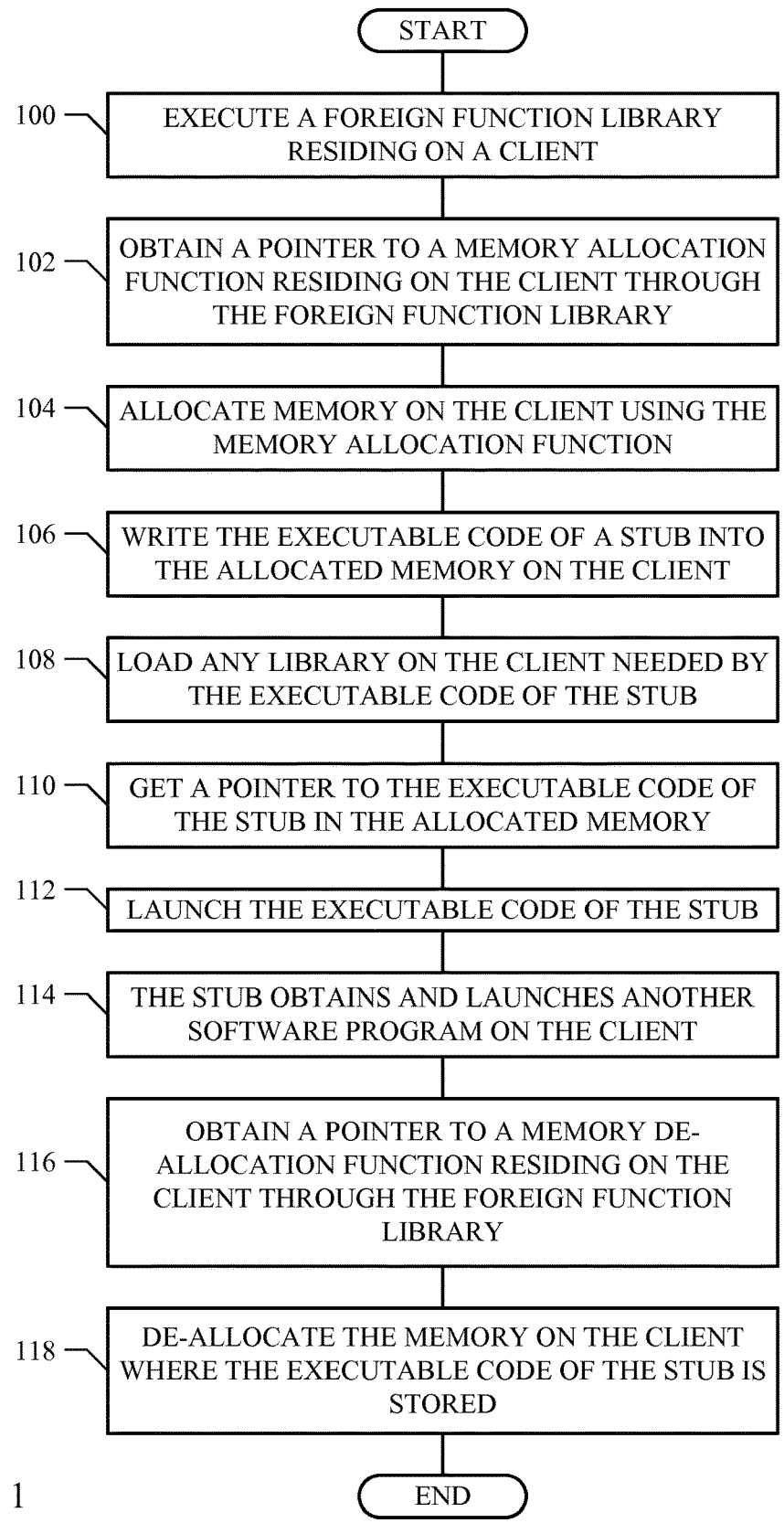
FIG. 1 illustrates an example method of deploying a piece of computer software from a server to a client for execution on the client without installing any portion of the software on the client.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Computer software may be distributed from one computer system (e.g., a server) to another computer system (e.g., a client) over a computer network (e.g., the Internet). In fact, an increasing number of software developers, manufactures, and distributors consider computer networks as a convenient, fast, and cost-effective channel for software distribution. For example, a person often is able to download the latest version of a piece of computer software developed by a company from that company's website. In a typical scenario, the person may load a web page that contains the download link to the piece of software in a web browser executed on his computer system, and then click the download link provided in the web page. This usually causes a file to be downloaded to the person's computer system. The file may be an installation script or executable or the executable code of the software itself. The person may save the file on the hard drive of his computer system. If the file is an installation script or executable, the person may run the downloaded file to install the software onto his computer system. On the other hand, if the file is the executable code of the software, the person may run the software directly (e.g., by double clicking on the executable file).

Having to save or install the software programs downloaded over the computer networks onto the hard drive of a computer system in order to execute the programs may be inconvenient or cumbersome at times. For example, first, saving downloaded files to a hard drive and installing software onto a computer system often take time. Furthermore, if a piece of software is large in size (e.g., Adobe® PDF Reader®), the installation process may take a significant amount of time. The user of the computer system may have to go through several steps (e.g., installation, setup, etc.) before he can execute the downloaded software. Second, saving files to a hard drive and installing software onto a computer system use up storage capacity (e.g., hard drive space) of the computer system. Sometimes, a computer system (e.g., a netbook or notebook computer) may not have sufficient storage space for all of the software its user wishes to install onto the computer system. Third, software developers may update their software and release newer versions of the software from time to time. The newer versions of a piece of software usually are of a better quality than the older versions. Thus, people may wish to keep their software relatively up-to-date. However, to update a piece of software, a person often needs to uninstall the older version of the software currently installed on his computer system and then download and install the newer version. In addition, some software developers may want to deliver software-based application services to users that do not require such installations as they would like to avoid having any downloaded code remain on permanent data storage devices after the initial, or any subsequent, use.

To address some of these issues, particular embodiments enable a user of one computer system (e.g., a client) to download computer software programs from another computer system (e.g., a server) over a computer network (e.g., the Internet) for execution on the user's computer system without having to store or install the software programs or any other types of software onto any permanent storage (e.g., the hard drive) of the user's computer system. In other words, the user may download a piece of software onto his computer system and execute that piece of software on his computer system. After the execution of the software is completed (e.g., after the user exits the software), there is no trace of the software or any other related software left on the user's computer system.

For purpose of clarification, hereafter, the computer system to which the software is downloaded and on which the software is executed is referred to as the "client", and the computer system from which the software is downloaded is referred to as the "server". However, one skilled in the art may appreciate that the embodiments described in more detail below may be suitably applied to any two computer systems (e.g., two servers, two clients, or a server and a client). In addition, the piece of software downloaded from the server to the client and executed on the client (i.e., the software that a person wants to use) is referred as the target software.

In particular embodiments, another piece of software, hereafter referred to as the "stub software" or simply a "stub", may facilitate the downloading and the execution of the target software. In particular embodiments, the stub may be implemented using any suitable programming language and compiled as computer executable code. In particular embodiments, the executable code of the stub may be stored on the server and downloaded to the client for execution using a client-side script written in any suitable programming language, such as, for example and without limitation, Java, JavaScript, Python, etc., which may be executed in a web browser. For example, the client-side script may be included in a web page as a clickable link. To access the client-side script, a user may load the web page containing the client-side script in a web browser (e.g., Microsoft Internet Explorer, Mozilla Firefox, or Google Chrome) residing on the client and then click the link to the client-side script provided in the web page. This causes the client-side script code to be transmitted to the web browser for execution by the web browser.

FIG. 1 illustrates an example method of deploying a target software from a server to a client for execution on the client through the use of a stub. In particular embodiments, once the client-side script is executed in a web browser, the script accesses a foreign function library residing on the client, as illustrated in STEP 100. Many programming languages provide foreign function interfaces. A foreign function interface is a mechanism by which a software program written in one programming language can invoke routines or make use of services written in another programming language (e.g., functions provided by an operating system or software library). Typically, the functions implementing the foreign function interface of a programming language are included in a foreign function library provided by that programming language. For example, Python provides a foreign function library called the "ctypes package"; Java provides Java Native Interface and Java Native Access that enable Java programs to access native shared libraries; and JavaScript provides JavaScript Native Interface (JSNI), also called JavaScript Foreign Function Interface (JSFFI). Some web browsers (e.g., Mozilla Firefox) also support native or foreign function access for code executing in these web browsers.

Depending on the specific programming language in which the script code is written, the script may invoke the corresponding foreign function library of that programming language. For example, with Python, there is a function called "load_library" that may be used to load a specific library. Microsoft Windows provides a function called "LoadLibrary" for loading a specified module into the address space of the calling process.

In particular embodiments, through the appropriate foreign function interface, the script may obtain a pointer to a memory allocation function residing on the client, as illustrated in STEP 102. The specific memory allocation function available on the client may depend on the operating system of the client or the software libraries available on the client. For example, Microsoft Windows provides a function called "VirtualAlloc" for reserving or committing a region of pages in the virtual address space of the calling process. C and C++ programming languages both provide a library function called "malloc" for performing dynamic memory allocation of a specified size.

In particular embodiments, using the memory allocation function (e.g., "VirtualAlloc"), the script may allocate a specific amount of memory, as illustrated in STEP 104. The allocated memory should be sufficient for the executable code of the stub. In particular embodiments, the executable code of the stub may be downloaded from the server and written into the allocated memory, as illustrated in STEP 106. In particular embodiments, the stub may require some library functions contained in various shared libraries. For example, with Microsoft Windows, the share libraries are called dynamic-link libraries (DLLs). The shared libraries containing the functions needed by the stub may be loaded using an appropriate library loading function (e.g., "LoadLibrary" or "load_library").

In particular embodiments, the memory in which the executable code of the stub is written is marked as executable memory. For example, Microsoft Windows provides a mechanism called data execution prevention (DEP), which is a set of hardware and software technologies that perform additional checks on memory to help protect against malicious code exploits. Briefly, all memory locations in a process are marked as non-executable unless the location explicitly contains executable code. Thus, the memory locations where the executable code of the stub are written need to be marked as executable in order for the stub code to be executed. With Microsoft Windows, specific memory locations may be marked as executable by setting an appropriate flag or attribute (e.g., marking the allocated memory as "PAGE_EXECUTE", "PAGE_EXECUTE_READ", "PAGE_EXECUTE_READWRITE", or "PAGE_EXECUTE_WRITECOPY").

In particular embodiments, the script may obtain a pointer to the executable code of the stub in the allocated memory, as illustrated in STEP 110. In particular embodiments, the executable code of the stub may be launched directly from memory, as illustrated in STEP 112. In particular embodiments, the stub may facilitate the download and execution of the target software on the client, as illustrated in STEP 114. This process is described in more detail below in connection with FIG. 2.

In particular embodiments, after the stub completes its tasks (i.e., facilitating the download and execution of the target software on the client), the script may obtain a pointer to a memory de-allocation function residing on the client, again through the appropriate foreign function interface, as illustrated in STEP 116. The specific memory de-allocation function available on the client may depend on the operating system of the client or the software libraries available on the client. For example, Microsoft Windows provides a function called "VirtualFree" for releasing, de-committing, or releasing and de-committing a region of pages within the virtual address space of the calling process. C and C++ programming languages both provide library functions such as "dealloc" and "free" for freeing up (i.e., de-allocating) allocated dynamic memory.

In particular embodiments, using the memory de-allocation function (e.g., "VirtualFree"), the script may de-allocate the memory in which the executable code of the stub is written, as illustrated in STEP 118. Subsequently, this memory space may be used for other purposes and other data may be loaded into the same memory space, overriding the executable code of the stub. Thus, after the memory locations where the executable code of the stub is written are freed (i.e., de-allocated), the executable code of the stub is gone (e.g., replaced or removed) from the client. There is no trace of the executable code of the stub left on the client, as the stub is not saved in or installed on any permanent storage (e.g., the hard drive) of the client.

In particular embodiments, instead of explicitly de-allocating the memory locations where the executable code of the stub is written, the memory locations may be freed up implicitly. For example, if the user exists the web browser or leaves the web page containing the client-side script, all memory locations involved with the script are freed up, which means the memory locations where the executable code of the stub is written are also freed up.

In particular embodiments, once executed directly from the allocated memory on the client, the stub facilitates the downloading and execution of the target software. In particular embodiments, the stub may establish a network connection between the client and a server where the target software is stored and download the executable code of the target software from the server over the network connection to the client. In particular embodiments, the executable code of the target software may be embedded in a data stream sent from the server to the client over the network connection. Upon receiving the data stream, the stub may extract the executable code of the target software and load it directly into the Random-Access Memory (RAM) of the client for execution on the client. The target software is not saved in or installed onto any permanent storage (e.g., the hard drive) of the client, same as the stub. Once the target software completes its execution on the client, the RAM space in which the executable code of the target software is loaded may be released and the target software no longer exists anywhere on the client.

The target software may be downloaded and launched on the client without having to be saved or installed on the client, which may decrease the usage of the storage capacity of the client. Furthermore, since the target software is downloaded just prior to its execution on the client, the latest or any desired version of the target software may be obtained each time the target software is downloaded and launched.

Figure 2:
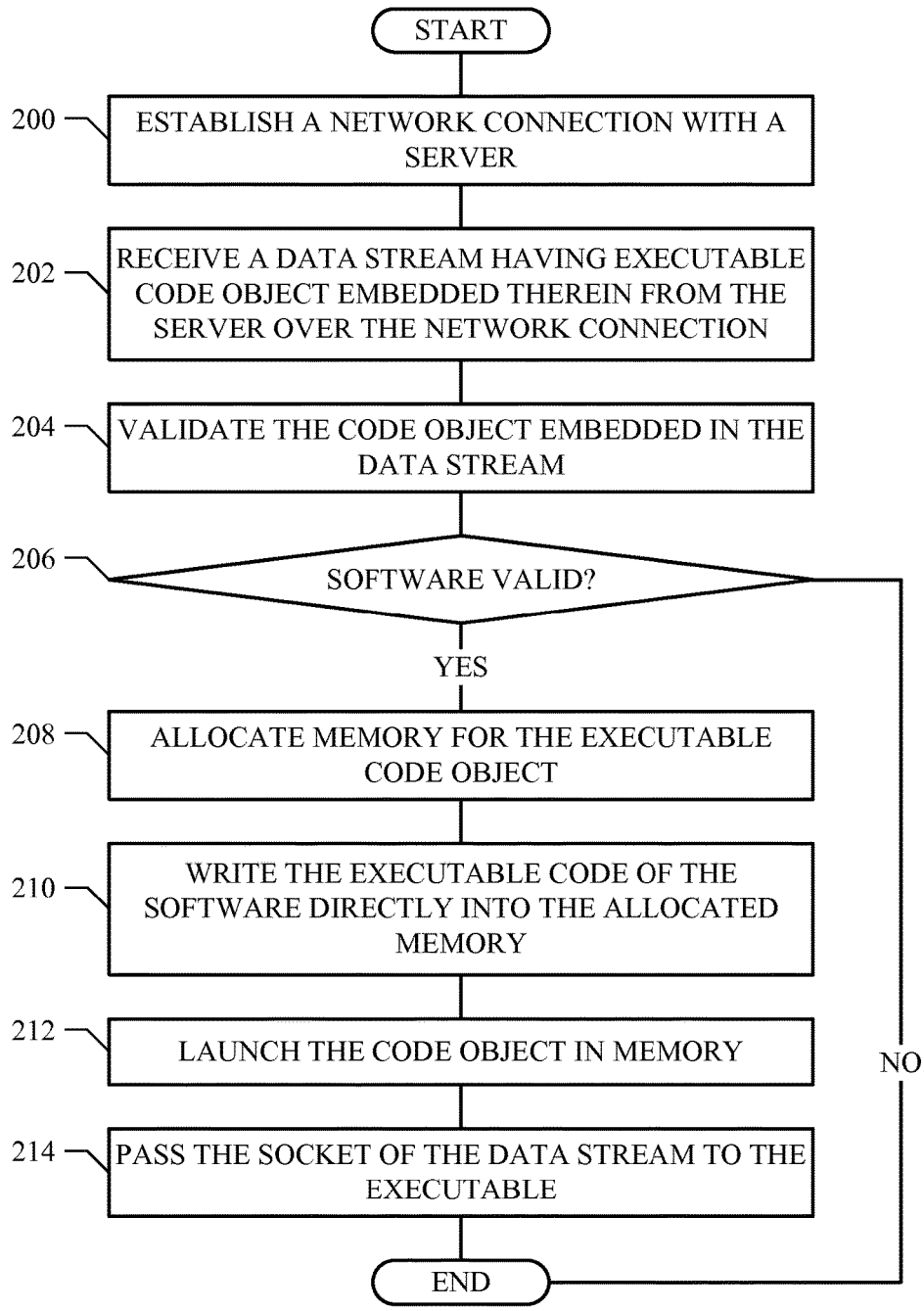
FIG. 2 illustrates an example method of streaming a piece of computer software from a server to a client for execution on the client.

FIG. 2 illustrates an example method for the stub to facilitate the downloading and execution of the target software on the client. In particular embodiments, the target software being downloaded is an application program. The executable code of the target software may be stored on a server, which may be the same server where the executable code of the stub is stored or a different server.

In particular embodiments, the stub may establish a network connection between the client and the server where the executable code of the target software is stored, as illustrated in step 200. The stub may take over an existing connection already established between the server and the client (e.g., the connection established by the web browser) or establish a new connection. If the stub establishes a new network connection, the new connection may be established using any suitable handshaking methods between two computer systems coupled to a computer network. For example, the stub executing on the client may send a connection request to the server, and the server, upon receiving the connection request, may send a response back, indicating whether the connection request is accepted or rejected. If the server has accepted the connection request, the network connection may be established between the client and the server accordingly. In particular embodiments, communications between the server and the client may use any suitable communication protocol, such as, for example and without limitation, Hypertext Transfer Protocol (HTTP), User Datagram Protocol (UDP), or Transport Control Protocol (TCP).

In particular embodiments, there may be multiple software programs stored on the server or there may be multiple versions of a particular software program stored on the server, which may be downloaded to individual clients. In particular embodiments, each version of each piece of software that may be downloaded from a server to a client by a stub executing on the client may be identified by a unique identifier. This unique identifier may be used to notify the server which specific piece of software a client's stub wishes to download. In particular embodiments, each piece of downloadable software may be considered a network resource. Thus, a particular piece of downloadable software may be identified by its unique network path or Uniform Resource Identifier (URI). The stub may reference to the target software using its URI.

Sometimes, a piece of software may have multiple versions. In particular embodiments, the stub may determine the most suitable version of the target software for the client. For example, there are multiple versions of the Microsoft Windows operating systems (e.g., Windows XP, Windows ME, or Windows 7) as well as 32-bit operating systems and 64-bit operating systems. The stub may examine the operating system of the client to determine the specific version of the target software most compatible with the operating system of the client. If the operating system of the client is a 32-bit operating system, then the stub may identify a 32-bit version of the target software. On the other hand, if the operating system of the client is a 64-bit operating system, then the stub may identify a 64-bit version of the target software.

In particular embodiments, when requesting a network connection with the particular server where the target software is stored, the stub may send the unique identifier of the target software to the server together with the connection request or as a part of the connection request. Alternatively, in particular embodiments, the stub may send the identifier of the target software to the server as a separate request after the connection between the server and the client has been established. The server may then determine which particular piece of software it should transmit to the requesting client. The process may be similar to invoking a data stream via a web browser (e.g., by clicking on a URL or URI link to a downloadable file contained in a web page).

In particular embodiments, the server may transmit a data stream to the requesting client, and more specifically, to the stub executing on the requesting client, over the network connection, as illustrated in step 202. The network connection may be a TCP connection, a UDP connection, a HTTP connection, or any other suitable connection. In particular embodiments, the data stream may be a video stream or an audio stream. In particular embodiments, the executable code of the target software requested by the stub may be embedded in the data stream as one or more data packets. For example, the target software may be a video decoder that receives a video stream encoded by a video codec, decodes the data and renders the video data on a display of the client. As another example, the target software may be a computer game.

In particular embodiments, the executable code of the target software may be embedded in the data stream. In particular embodiments, the executable code of the target software may be machine code or native code and may be platform-dependent. In particular embodiments, the executable code of the target software has been complied to run on the platform of the particular client requesting the target software (e.g., based on the client's hardware architecture and operating system).

In particular embodiments, the data stream may include two portions. In particular embodiments, the first portion of the data stream (i.e. the beginning of the data stream) may contain the executable code of the target software. In particular embodiments, the executable code of the target software may be optionally compressed using any suitable compression methods. For example, a lossless compression method, such as zip or gzip, may be used to compress the executable code of the target software. In particular embodiments, the executable code of the target software may be embedded within a video stream. As most types of video streams are generic container formats, data, and more specifically, the executable code of the target software, may be embedded in such a video stream. In particular embodiments, the first portion of the data stream may also include operational variables and parameters, such as a parameter that indicates the size of the memory space (e.g., RAM memory space) needed to load and execute the executable code of the software.

In particular embodiments, the second portion of the data stream may optionally contain additional data that may be consumed by the target software during its execution. In particular embodiments, the additional data may be optionally encoded or compressed using any suitable encoding or compressing methods and transmitted as one or more data packets. Again, if the data stream is a video stream, then the additional data may be encoded using a video encoding method, such as MPEG encoding.

In particular embodiments, upon receiving the data stream, the stub may access the first portion of the data stream to extract the executable code of the target software embedded therein. If needed, the stub may decode or decompress the extracted executable code of the target software. The decoding or decompressing methods used by the stub may correspond to the encoding or compressing methods used to encode or compress the executable code of the target software. For example, if the executable code of the target software has been compressed using a suitable compression algorithm (e.g., a lossless compression algorithm), the stub may decompress it using a corresponding decompression algorithm. Similarly, if the executable code of the target software has been encoded using a suitable encoding algorithm, the stub may decode it using a corresponding decoding algorithm. In addition, in particular embodiments, the stub may also access the first portion of the data stream to extract the parameters that indicate the size of the memory space needed to load and execute the executable code of the target software.

In particular embodiments, to prevent unauthorized or malicious software from being downloaded and executed on the client, the stub may validate the executable code of the target software extracted from the first portion of the data stream using any suitable validation methods, as illustrated in step 204. In particular embodiments, a white list of trusted sources (e.g., domain names or IP addresses of trusted servers) may be provided with the stub. Upon receiving a piece of software, the stub may compare the source (e.g., the server or website) transmitting the software against its white list. Only software transmitted by the trusted sources on the white list may be executed on the client. Software received from sources not on the white list may be discarded or quarantined. In particular embodiments, the executable code of the target software embedded in the first portion of the data stream may be signed and associated with a digital certificate. The stub may validate the executable code of the target software using its associated digital certificate.

If the executable code of the target software is not valid (step 206, "NO"), then the executable code of the target software is not launched on the client and may be discarded. On the other hand, if the executable code of the target software is valid (step 206, "YES"), then, in particular embodiments, the stub may allocate a sufficient amount of memory on the client for loading and executing the executable code of the target software, as illustrated in step 208. In particular embodiments, the amount of memory allocated may not be less than the size of the memory space needed to load and execute the executable code of the target software, as indicated by the variable included in the first portion of the data stream. In particular embodiments, the allocated memory may be dynamic memory, virtual memory, or RAM of the client.

Most operating systems provide library functions that enable an application program to allocate and de-allocate virtual or dynamic memory and perform other types of memory-related functions during runtime. In particular embodiments, the stub may, through an appropriate foreign function library, invoke appropriate library functions provided by the operating system of the client to allocate the required memory space for the executable code of the target software. For example, as described above, "malloc" is a standard library function of both C and C++ programming languages for allocating dynamic memory space. For Microsoft Windows platforms, "VirtualAlloc" is a Win32 library function for reserving a region of pages in the virtual address space. Once the memory has been allocated, the stub may invoke appropriate library functions to set the flag for the allocated memory space as "executable", which indicates to the operating system that the data stored in the allocated memory are executable code. For example, with Microsoft Windows, the attribute "PAGE_EXECUTE", "PAGE_EXECUTE_READ", "PAGE_EXECUTE_READWRITE", or "PAGE_EXECUTE_WRITECOPY" may be specified in connection with the memory allocation (e.g., using "VirtualAlloc") to ask the operating system for a sufficient amount of virtual memory that has the right for executing code, and operationally with the rights for reading or writing code.

In particular embodiments, the stub may load the executable code of the target software directly into the allocated memory (e.g., the allocated dynamic memory) without having to save or install the executable code of the target software on the hard drive of the client, as illustrated in step 210. In particular embodiments, the stub may invoke appropriate library functions provided by the operating system of the client or the software libraries on the client to copy the binary data representing the executable code of the target software directly into the allocated virtual or dynamic memory space. For example, with Microsoft Windows, "CopyMemory" is a function for copying a block of memory from one location to another location; and "memcpy" is a standard library function of both C and C++ programming languages for copying data from one memory location to another memory location.

In particular embodiments, the target software may require certain library functions. If a required library function already exists on the client, the stub may load the shared library containing the required library function for the target software. For example, with Microsoft Windows, a shared library (e.g., a DLL) may be loaded using the "LoadLibrary" function. On the other hand, if a required library function does not exist on the client, the stub may download the shared library containing the required library function or the required library function by itself from an appropriate server, allocate virtual memory for the shared library or the required library function, and write the shared library or the required library function in the allocated virtual memory so that the target software may use the library function when needed. In other words, for those resources (e.g., library functions) needed by the target software during its execution, if the resources already exist on the client, the resources on the client are used; and if the resources do not exist on the client, the stub download the resources for the target software.

In particular embodiments, the stub may also adjust a branch table, also referred to as a jump table, to include the information concerning the executable code of the target software loaded in the allocated memory. This process may be referred to as a "fix-up" process. A branch table is an efficient method of transferring program control from one part to another part of a program or from one program to another program. By adjusting the appropriate branch table entries, the operating system may be made aware of the executable code of the software now loaded in the allocated memory.

The actual steps that are performed during a fix-up process may vary depending on the platform or the operating system of the client. For example, with Microsoft Windows platform, an executable format typically has a relocation table and an import table. In general, the executable code is linked assuming it will be loaded to a fixed address. In order to load the executable code into a different address, any absolute addresses used by the executable code are found and "fixed-up" to cater for the change in the base address. This may be achieved using the relocation table. In particular embodiments, the relocation table compiles a list of all of the absolute addresses within the executable code such that they may be fixed up when the executable code is loaded. The import table lists the absolute addresses of all of the routines that the executable code may call. This may include both API routines and routines in other dynamic-link libraries (DLLs). These import addresses are replaced with the actual addresses of the routines within the address space of the current process. The import table is a list of the location of these addresses within the executable code (the addresses may be within a jump table or trampoline area, but also may be a list of data for indirect calls).

Particular embodiments may take advantage of the Portable Executable (PE) format, which is a file format for executables, object code, and DLLs used in Microsoft Windows operating systems. The PE format is versatile in numerous environments of operating system software architecture. Generally, the PE format is a data structure that encapsulates the information necessary for the Microsoft Windows operating system loader to manage the wrapped executable code. Particular embodiments may compile and save the executable code of the software using the PE format. For other platforms, implementations of the invention may operate with raw executable code that requires a single entry point without any fixups. In some implementations, the raw executable code can be configured to perform the fixups itself and can cover such code as ELF and MACH-O.

In particular embodiments, the target software may be executed on the client, as illustrated in step 212. In particular embodiments, the executable code of the target software may be launched directly from the allocated dynamic memory in which it is stored. In particular embodiments, the stub may cause the executable code of the target software loaded in the allocated memory to begin execution. Consequently, the stub may transfer the execution to the target software.

In particular embodiments, the stub may pass the socket, or more precisely, the Internet socket or the network socket, associated with the network connection between the client and the server and the data stream to the target software that is now being executed on the client, as illustrated in 214. Network sockets constitute a mechanism for delivering incoming data packets to the appropriate application process or thread. By passing the network socket associated with the data stream to the target software, the target software may now receive the additional data packets that contain the additional data in the second portion of the data stream. The target software may then consume (e.g., process) the additional data contained in the second portion of the data stream. In particular embodiments, the stub may invoke appropriate library functions provided by the operating system of the client to pass the network socket to the now executing target software. For example, the Windows Sockets Application Programming Interface (API), also referred to as Winsock, enables a network socket to be passed from one process to another using the "WSADuplicateSocket" function.

The target software may continue its execution until it is completed. In particular embodiments, once the target software has completed its execution (i.e., has exited), the dynamic memory space used to load the executable code of the target software program may be de-allocated (e.g., by the operating system of the client). For example, with Microsoft Windows, the "VirtualFree" function may be invoked to free up the allocated memory where the excitable code of the target software is stored. Subsequently, this memory space may be used for other purposes and other data may be loaded into the same memory space, overriding the executable code of the target software. At this point, the target software no longer exits on the client without any state changes to client (e.g., no files on a drive, no system registry changes, etc.) because it was installed by the stub directly into memory and not stored in any persistent media on the client including, in some embodiments, the browser cache or other temporary data storage mechanisms.

In some embodiments, a first executable code object embedded in the stream and launched by the stub may itself cause another process to be generated by requesting another data stream that also includes a second executable code object. The second executable code object may be launched as a child process of the first executable code object and share the same sand-boxed file system generated by the first executable code object. For example, the first executable code object may be a virtual machine that allows one or more second executable code objects to run entirely in memory and sand-boxed by the first virtual machine code object. In particular implementation, for example, writes to a data storage subsystem by the second code object are written by the virtual machine into memory, not a peripheral device which could be analyzed when a user logs off the client. For example, this embodiment can be used to allow for demonstration versions of software in that the first executable code object may be a virtual machine that sandboxes a second program to be demonstrated or tested. As discussed above, when the first and second executable code objects end, all traces of them in memory are gone. The foregoing embodiment can also be used to prevent unauthorized access to data that is typically cached during application execution.

Figure 3:
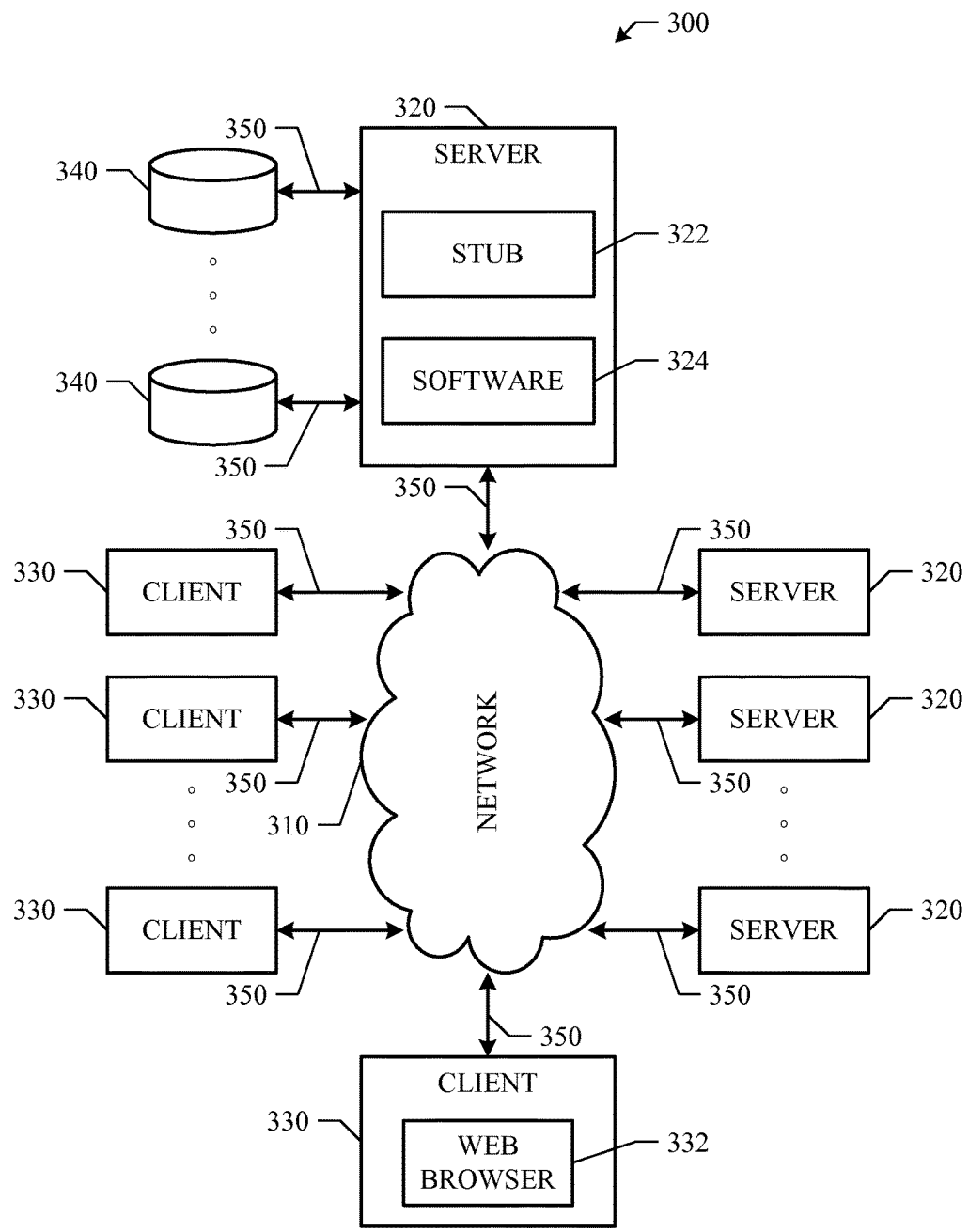
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a portion of the Internet, or another network 310 or a combination of two or more such networks 310. This disclosure contemplates any suitable network 310.

One or more links 350 couple a server 320 or a client 330 to network 310. In particular embodiments, one or more links 350 each includes one or more wireline, wireless, or optical links 350. In particular embodiments, one or more links 350 each includes an intranet, an extranet, a VPN, a LAN, a WLAN, a WAN, a MAN, a portion of the Internet, or another link 350 or a combination of two or more such links 350. This disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, the executable code of a stub 322 and the executable code of a piece of software 324 may reside on a server 320. They may be downloaded to a client 330 for execution without being saved or installed on client 330. While they are being executed on client 330, they exist in the virtual memory on client 330. After their executions are completed, they are removed from client 330 when the virtual memory is freed up, thus leaving no trace on client 330.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. In particular embodiment, each data storage 340 may be a relational database. Particular embodiments may provide interfaces that enable servers 320 or clients 330 to manage, e.g., retrieve, modify, add, or delete, the information stored in data storage 340.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. This disclosure contemplates any suitable clients 330. A client 330 may enable a network user at client 330 to access network 330. A client 330 may enable its user to communicate with other users at other clients 330.

A client 330 may have a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 4:
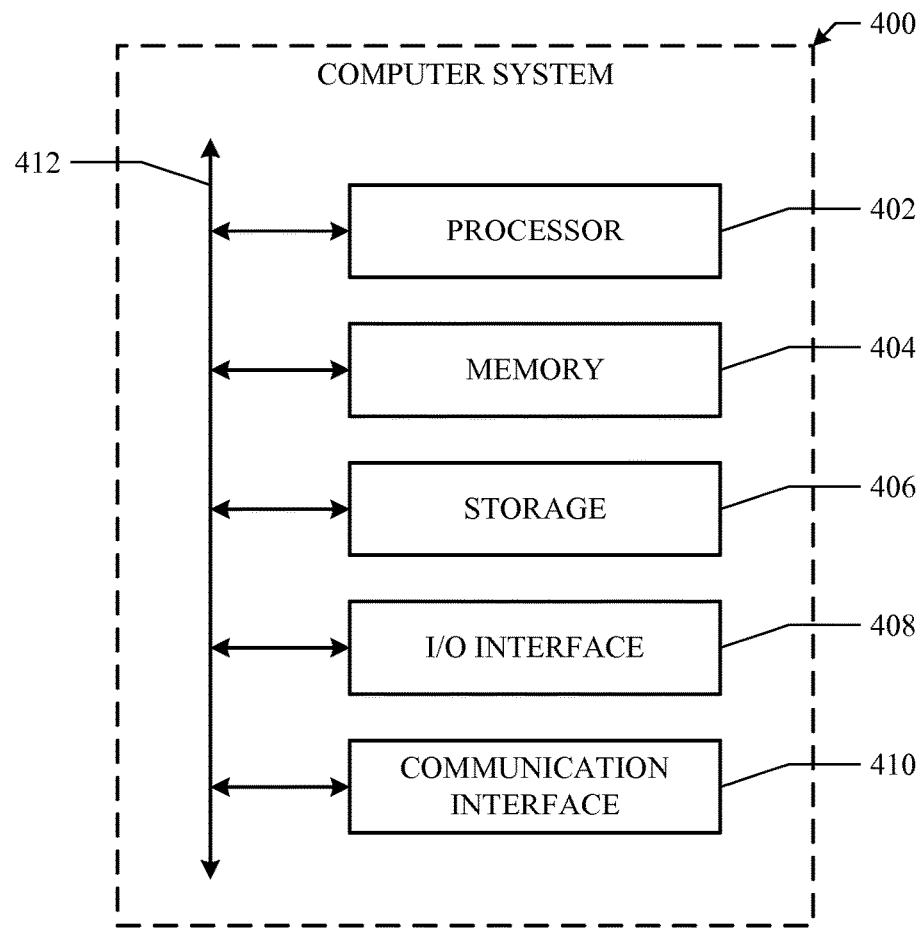
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
   allocating, by a first computing device, a first virtual memory;
   receiving, by the first computing device, executable code of a first software from a disparate second computing system via a communication network;
   writing, by the first computing device, the executable code of the first software directly into the first virtual memory;
   marking, by the first computing device, the first virtual memory as executable;
   executing, by the first computing device, the executable code of the first software directly from the first virtual memory;
   determining, by the first computing device via the execution of the first software, a specific version of a second software to be downloaded by identifying an operating system of the first computing device and identifying the specific version of the second software most compatible with the operating system;
   allocating, by the first computing device via the execution of the first software, a second virtual memory for loading and executing the second software, the second virtual memory being distinct from the first virtual memory;
   downloading, by the first computing device, executable code of the specific version of the second software for directly writing into the second virtual memory as facilitated by the downloaded executable code of the first software, the second software is disparate from the first software;
   executing, by the first computing device, the executable code of the second software; and
   de-allocating, by the first computing device, the first virtual memory distinct from the second virtual memory after the execution of the executable code of the first software is completed so that memory locations of the first virtual memory are released.

2. The method recited in claim 1, further comprising loading, by the first computing device, one or more shared libraries needed by the executable code of the first software.

3. The method recited in claim 1, wherein downloading and executing the executable code of the second software as facilitated by the executable code of the first software further comprises:
   receiving, by the first computing device, the executable code of the second software;
   extracting, by the first computing device, the executable code of the second software from a data stream;
   writing, by the first computing device, the executable code of the second software directly into the second virtual memory;
   marking, by the first computing device, the second virtual memory as executable; and
   executing, by the first computing device, the executable code of the second software directly from the second virtual memory.

4. The method recited in claim 3, further comprising:
   validating, by the first computing device, the executable code of the second software;
   loading, by the first computing device, one or more first shared libraries needed by the executable code of the second software existing on the first computing device; and
   downloading, by the first computing device, one or more second shared libraries needed by the executable code of the second software from a second computing device.

5. The method recited in claim 3, further comprising de-allocating, by the first computing device, the second virtual memory after the execution of the executable code of the second software is completed so that there is no trace of the executable code of the second software on the first computing device.

6. The method recited in claim 3, wherein:
   the executable code of the second software is received from a third computing device.

7. The method recited in claim 3, wherein the executable code of the second software is embedded in the data stream.

8. A first system, comprising:
   a memory comprising instructions executable by one or more processors; and
   one or more processors coupled to the memory and operable to execute the instructions, the memory comprising instructions for:
   allocating a first virtual memory;
   receiving executable code of a first software from a disparate second computing system via a communication network;
   writing the executable code of the first software directly into the first virtual memory;
   marking the first virtual memory as executable;
   executing the executable code of the first software directly from the first virtual memory;
   determining via the execution of the first software, a specific version of a second software to be downloaded by identifying an operating system of the first system and identifying the specific version of the second software most compatible with the operating system;
   allocating, via the execution of the first software, a second virtual memory for loading and executing the second software, the second virtual memory being distinct from the first virtual memory;
   downloading executable code of the specific version of the second software for directly writing into the second virtual memory as facilitated by the downloaded executable code of the first software, the second software is disparate from the first software;
   executing the executable code of the second software; and
   de-allocating the first virtual memory distinct from the second virtual memory after the execution of the executable code of the first software is completed so that memory locations of the first virtual memory are released.

9. The system recited in claim 8, wherein the instructions further comprise instructions for loading one or more shared libraries needed by the executable code of the first software.

10. The system recited in claim 8, wherein the instructions for downloading and executing the executable code of the second software as facilitated by the executable code of the first software further comprises instructions for:
receiving the executable code of the second software;
extracting the executable code of the second software from the data stream;
writing the executable code of the second software directly into the second virtual memory;
marking the second virtual memory as executable; and
executing the executable code of the second software directly from the second virtual memory.

11. The system recited in claim 10, wherein the one or more processors are further operable when executing the instructions to:
validating the executable code of the second software;
loading one or more first shared libraries needed by the executable code of the second software existing on the first computing device; and
downloading one or more second shared libraries needed by the executable code of the second software from a second computing device.

12. The system recited in claim 10, the memory further comprising instructions for de-allocating the second virtual memory after the execution of the executable code of the second software is completed so that there is no trace of the executable code of the second software on the first computing device.

13. The system recited in claim 10, wherein:
the executable code of the second software is received from a third computing device.

14. The system recited in claim 10, wherein the executable code of the second software is received from the disparate second computing system.

15. The system recited in claim 10, wherein the executable code of the second software is embedded in a data stream.

16. One or more computer-readable storage media embodying software operable when executed by a first computer system to:
allocating a first virtual memory;
receiving executable code of a first software from a disparate second computing system via a communication network;
writing the executable code of the first software directly into the first virtual memory;
marking the first virtual memory as executable;
executing the executable code of the first software directly from the first virtual memory;
determining via the execution of the first software, a specific version of a second software to be downloaded by identifying an operating system of the first computer system and identifying the specific version of the second software most compatible with the operating system;
allocating, via the execution of the first software, a second virtual memory for loading and executing the second software, the second virtual memory being distinct from the first virtual memory;
downloading executable code of the specific version of the second software for directly writing into the second virtual memory as facilitated by the executable code of the first piece of software the second software is disparate from the first software;
executing the executable code of the second software; and
de-allocating the first virtual memory distinct from the second virtual memory after the execution of the executable code of the first software is completed so that memory locations of the first virtual memory are released.

17. The media recited in claim 16, further comprising instructions for:
loading one or more shared libraries needed by the executable code of the first software.

18. The media recited in claim 16, wherein the instructions for downloading and executing the executable code of the second software further comprise instructions for:
receiving the executable code of the second software;
extracting the executable code of the second software from the data stream;
writing the executable code of the second software directly into the second virtual memory;
marking the second virtual memory as executable; and
executing the executable code of the second software directly from the second virtual memory.

19. The media recited in claim 18, wherein the software is further operable when executed by the first computer system to:
validating the executable code of the second software;
loading one or more first shared libraries needed by the executable code of the second software existing on the first computing device; and
downloading one or more second shared libraries needed by the executable code of the second software from a second computing device.

20. The media recited in claim 18, further comprising instructions for de-allocating the second virtual memory after the execution of the executable code of the second software is completed so that there is no trace of the executable code of the second software on the first computing device.

21. The media recited in claim 18, wherein:
the executable code of the second software is received from a third computing device.

22. The media recited in claim 18, wherein the executable code of the second software is received from a second computing device.

23. A method, comprising:
receiving, by a first computing device, a request for an executable code of a first software from a client device, the executable code of the first software is configured to generate a request for the second software upon execution from a virtual memory of the client device;
transmitting, by the first computing device, the executable code of the first software to the client device in response to the request; and
configuring, by the first computing device, the client device to determine via the execution of the first software, a specific version of a second software to be downloaded by identifying an operating system of the client device and identifying the specific version of the second software most compatible with the operating system and to transmit a request for the specific second software via the executable code of the first software, the first software and the second software are configured to be respectively written and executed from a first and second virtual memories allocated on the client device and the second software is disparate from the first software;
providing, by the first computing device, a script configured to access a memory de-allocation function that de-allocates the first virtual memory of the client device allocated to the first software after the execution of the executable code of the first software is completed so that memory locations of the virtual memory on the client device are released.

24. The method of claim 23, further comprising:
receiving, by the first computing device, the request for the second software;
transmitting, by the first computing device, the executable code of the second software to the client device.

25. The method of claim 23, wherein configuring the client device to request for a second software further comprises:
configuring, by the first computing device, the client device to transmit a request for the second software to a third computing device that is disparate from the first computing device.

* * * * *